US012789745B1

(12) United States Patent
Farooq et al.

(10) Patent No.: US 12,789,745 B1
(45) Date of Patent: Nov. 10, 2026

(54) GRILLE MOUNTED AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/256,510

(22) Filed: Jul. 1, 2025

(51) Int. Cl.
*B60R 21/36* (2011.01)

(52) U.S. Cl.
CPC .................................... *B60R 21/36* (2013.01)

(58) Field of Classification Search
CPC .......................... B60R 21/36; B60R 2021/346
See application file for complete search history.

(56) References Cited

U.S. PATENT DOCUMENTS 5,646,613 A * 7/1997 Cho ...................... G01S 13/931 340/904
7,000,725 B2 * 2/2006 Sato ........................ B60R 21/36 180/274
7,073,619 B2 * 7/2006 Alexander ............. B60R 21/36 180/274
7,174,985 B2 2/2007 Sawa et al.
7,185,728 B2 * 3/2007 Makita .................. B60R 19/205 180/274
7,232,001 B2 * 6/2007 Hakki ................... B60R 19/205 180/271
7,753,159 B2 * 7/2010 Kim ........................ B60R 21/36 180/274
7,784,817 B2 * 8/2010 Choi ..................... B60R 19/205 180/274
7,836,996 B2 * 11/2010 Kitte ....................... B60R 21/36 180/274
8,408,350 B2 * 4/2013 Wilmot .................. B60R 21/36 180/274
10,953,844 B2 3/2021 Farooq et al.
10,953,845 B2 3/2021 Nakamura et al.
10,988,105 B2 * 4/2021 Gunji ...................... B60R 21/38
11,491,950 B2 11/2022 Farooq et al.
11,608,025 B2 3/2023 Cord
11,766,990 B1 9/2023 Farooq et al.
12,187,210 B2 * 1/2025 Farooq .................... B60R 21/36
12,233,813 B2 * 2/2025 Farooq ................ B60R 21/2338
2009/0102167 A1 4/2009 Kitte et al.
2019/0084521 A1 3/2019 Farooq et al.
(Continued)

FOREIGN PATENT DOCUMENTS

CN 115214525 B 6/2024
CN 118457486 A 8/2024
(Continued)

*Primary Examiner* — Laura Freedman
(74) *Attorney, Agent, or Firm* — Frank A. Mackenzie; Brooks Kushman P.C.

(57) ABSTRACT

A vehicle includes a grille and a hood disposed above the grille. The hood extends vehicle rearward of the grille. An airbag is inflatable from an uninflated position to an inflated position. The airbag is supported by the grille in the uninflated position and in the inflated position. The airbag includes an upper panel inflatable vehicle rearward from the grille above the hood and a lower panel inflatable vehicle forward of the grille.

19 Claims, 5 Drawing Sheets

(56) References Cited

U.S. PATENT DOCUMENTS

| | | | | |
|---|---|---|---|---|
| 2021/0402952 | A1 * | 12/2021 | Nakamura .............. | B60R 21/36 |
| 2024/0367607 | A1 | 11/2024 | Farooq et al. | |

FOREIGN PATENT DOCUMENTS

| | | | | | |
|---|---|---|---|---|---|
| JP | 2000168473 | A | * | 6/2000 | ............. B60R 21/36 |
| JP | 2000219094 | A | * | 8/2000 | ............. B60R 21/36 |
| JP | 2001315599 | A | * | 11/2001 | |
| JP | 2009012587 | A | * | 1/2009 | |
| JP | 2020164029 | A | * | 10/2020 | |

* cited by examiner

GRILLE MOUNTED AIRBAG

BACKGROUND

Some automobiles include pedestrian airbags deployable during certain vehicle impacts to control the kinematics of a pedestrian outside of the vehicle during the impact. Several factors affect the design of the pedestrian airbag including bumper height, clearance requirements and off-road capabilities. These design factors are also limited by packaging constraints associated with the exterior of the vehicle. There is an opportunity to design a vehicle front end to control the kinematics of a pedestrian during certain impacts while accounting for these several design factors.

DETAILED DESCRIPTION

Figure 1:
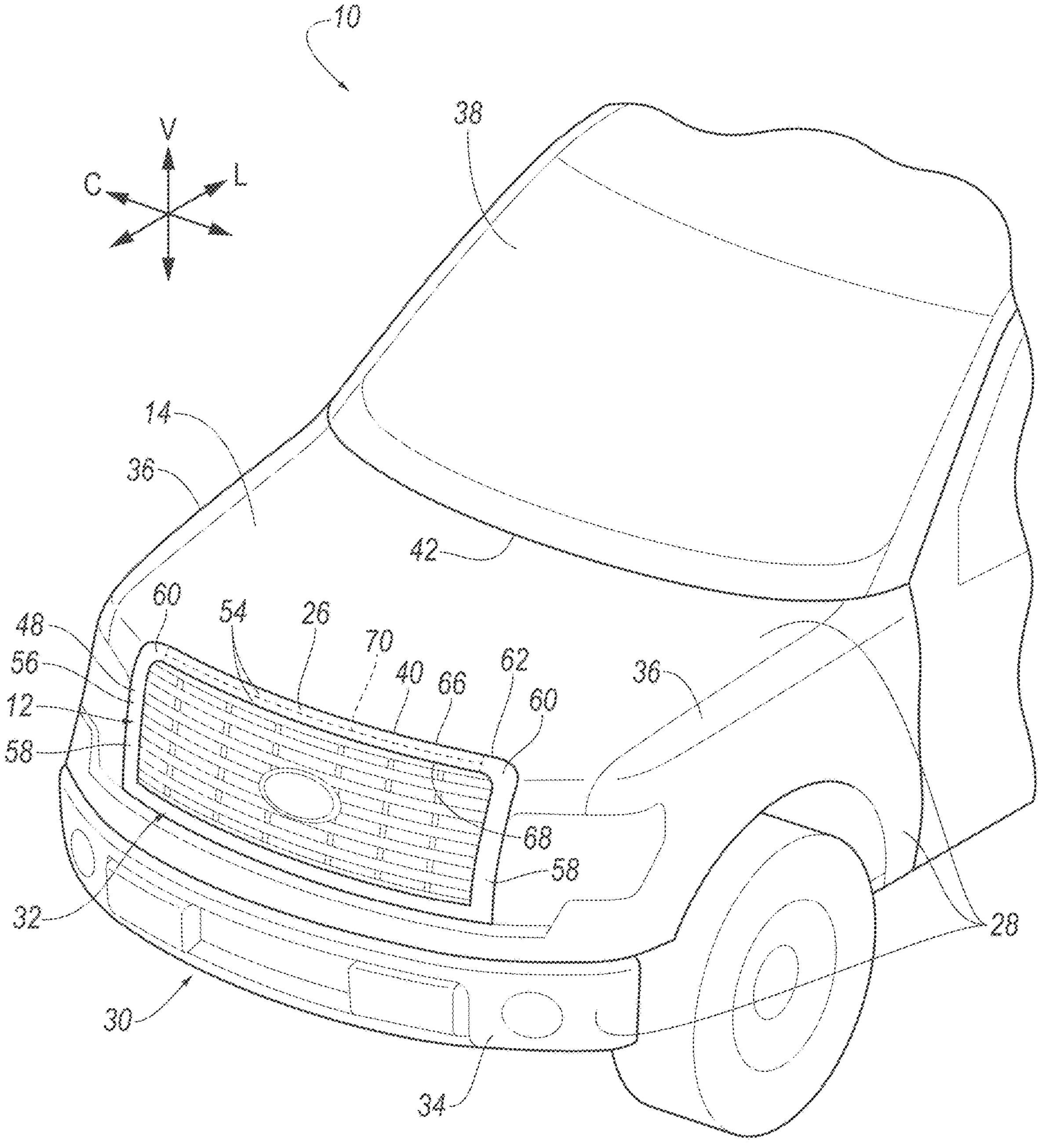
FIG. 1 is a perspective view of a front end of a vehicle with an airbag of a grille assembly in an uninflated position.

With reference to the Figures, wherein like numerals indicate like parts throughout the several views, a grille 12 for a vehicle 10 is shown. The vehicle 10 includes a hood 14 disposed above the grille 12 and extending vehicle rearward of the grille 12. An airbag 16 is inflatable from an uninflated position (FIGS. 1, 3, 4) to an inflated position (FIGS. 2 and 5). The airbag 16 is supported by the grille 12 in the uninflated position and in the inflated position. The airbag 16 includes an upper panel 18 inflatable vehicle rearward from the grille 12 above the hood 14 and a lower panel 20 inflatable vehicle forward of the grille 12.

The airbag 16 is positioned to control the kinematics of a pedestrian during certain vehicle impacts by inflation of the upper panel 18 rearward toward the hood 14 and inflation of the lower panel 20 vehicle forward of the grille 12. Specifically, the upper panel 18 is positioned to control the kinematics of a pedestrian at the hood 14 and the lower panel 20 is positioned to control the kinematics of the pedestrian at the grille 12. The position of the airbag 16 supported by the grille 12 in the uninflated position and in the uninflated position provides flexibility in other design factors in pedestrian airbag design. The grille 12 and the airbag 16 may be assembled prior to assembly to the rest of the vehicle 10. In some examples, the grille 12 and the airbag 16 may be received at a vehicle assembly plant as a part-in-assembly to be assembled as a unit to the rest of the vehicle 10.

In some examples, the grille 12 includes an upper door 22 and a lower door 24 concealing the airbag 16 in the uninflated position. In such examples, the upper door 22 and the lower door 24 may have a class-A surface 26 concealing the airbag 16. In the event the airbag 16 inflates, the airbag 16 forces the doors 22, 24 open. Specifically, the upper panel 18 of the airbag 16 opens the upper door 22 and the lower panel 20 of the airbag 16 opens the lower door 24. In such an example, the upper door 22 acts as a guide to guide the upper panel 18 of the airbag 16 toward the hood 14, and the lower door 24 acts as a guide to guide the lower panel 20 of the airbag 16 downwardly across the grille 12. The doors 22, 24 provide flexibility in packaging and styling design factors for the grille 12.

The vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 defines a vehicle-longitudinal axis L extending between a front end and a rear end of the vehicle 10. The vehicle 10 defines a cross-vehicle axis C extending cross-vehicle from one side to the other side of the vehicle 10. The vehicle 10 defines a vertical axis V. The vehicle-longitudinal axis L, the cross-vehicle axis C and the vertical axis V are perpendicular relative to each other.

The vehicle 10 includes a body 48 including exterior body 48 panels 28. The exterior body 48 panels 28 may include the hood 14, a bumper 34, front fenders 36, etc. The exterior body 48 panels 28 have a class-A surface, i.e., a finished surface exposed to view by a customer and free of unaesthetic blemishes and defects. The exterior body 48 panels 28 may be supported by a frame of the vehicle 10, e.g., as a unibody 48 architecture, body 48-on-frame architecture, etc.

In some examples, the vehicle 10 may include an internal combustion engine and an engine cooling system. In such examples, the engine cooling system may include a heat-exchanger system that may include a radiator, condenser, mount, etc., at a front end 30 of the vehicle 10. In other examples, the vehicle 10 may be a battery-electric vehicle (BEV). In such examples, the vehicle 10 may or may not include a heat-exchanger system at the front end 30 of the vehicle 10. In examples including a heat-exchanger system, the heat-exchanger system may cool an internal-combustion engine, BEV battery, etc., and/or may be used to control the heating/ventilation/air condition (HVAC) of the interior of the vehicle 10.

Figure 2:
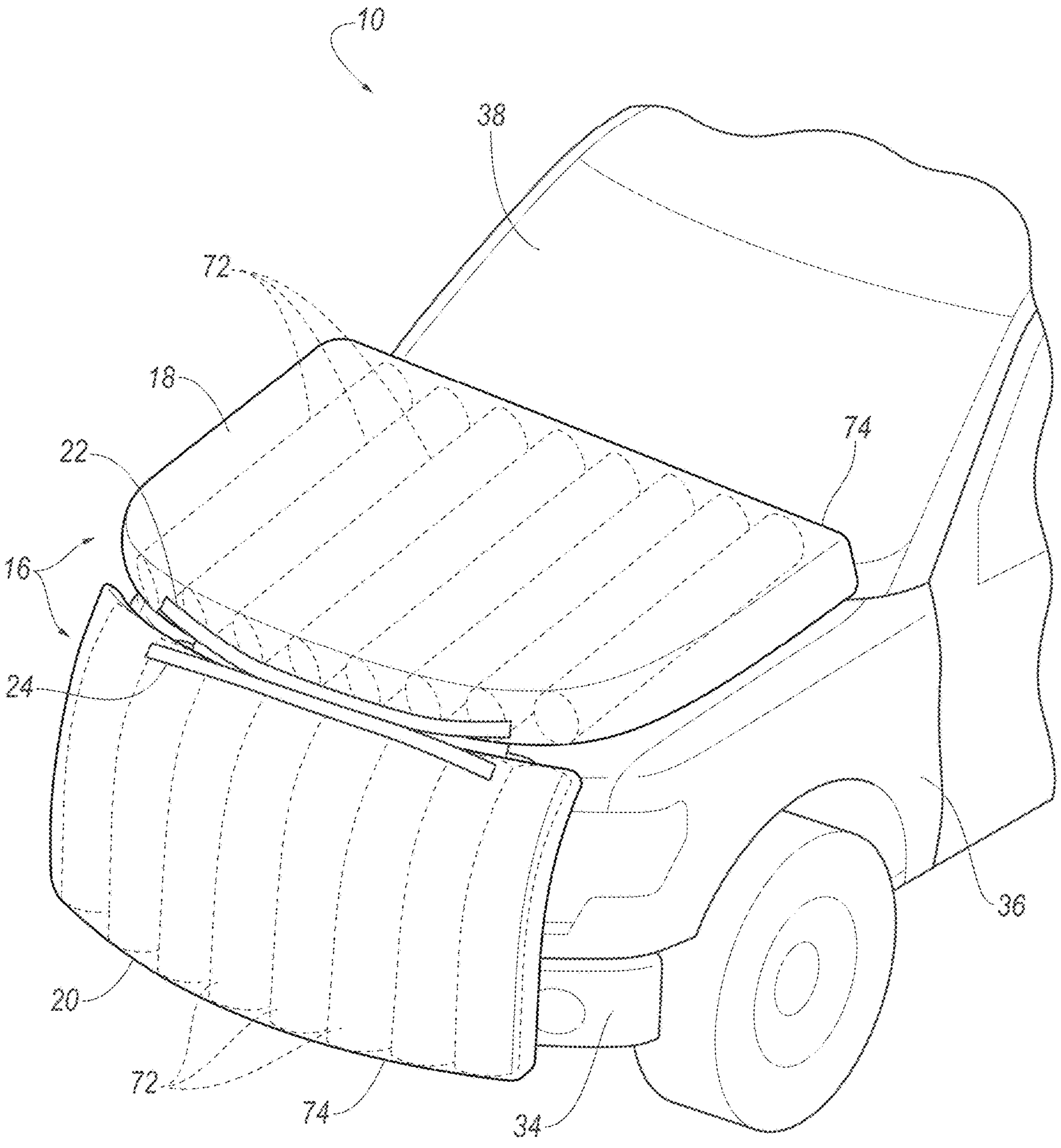
FIG. 2 is a perspective view of the front end of the vehicle with the airbag in the inflated position.

With reference to FIGS. 1-2, the front end 30 of the vehicle 10 includes a grille assembly 32, the bumper 34, and the hood 14. The grille assembly 32 is above the bumper 34. The grille assembly 32 may be a component of the vehicle body 48 and may be supported on other components of the vehicle body 48.

The bumper 34 is connected to and supported by the vehicle body 48 and/or the vehicle frame. The bumper 34 may be a front bumper, as shown in the Figures. In other words, the bumper 34 assembly may be at the front end 30 of the vehicle 10. The bumper 34 is elongated along the cross-vehicle axis C. The bumper 34 has a vehicle-forward face. The vehicle-forward face of the bumper 34 may be a class-A surface, i.e., a surface specifically manufactured to have a high-quality, finished aesthetic appearance free of blemishes. The bumper 34 may be of any suitable material such as metal (steel, aluminum, etc.), or polymeric (e.g., sheet molding composite (SMC), carbon fiber reinforced plastic (CFRP), fiberglass, and/or other fiber reinforced plastic).

The bumper 34 is below the grille assembly 32. Specifically, the bumper 34 is vertically lower than the grille assembly 32. In some examples, a portion of the bumper 34 may be beneath the grille 12, i.e., directly vertically below the grille 12.

The vehicle 10 includes a hood 14. The hood 14 is disposed above the grille 12. Specifically, the hood 14 is vertically higher than the grille 12. In some examples, a forward edge of the hood 14 may be over the grille 12, i.e., directly vertically above the grille 12. The hood 14 extends vehicle rearward of the grille 12. In the example shown in the Figures, the hood 14 extends vehicle rearward from the grille 12 along the vehicle-longitudinal axis L toward a windshield 38. Specifically, the hood 14 has a vehicle-forward edge 40 adjacent the grille 12 and a vehicle-rearward edge 42 adjacent the windshield 38. In such examples, gaps may be between the hood 14 and the grille 12 and between the hood 14 and the windshield 38.

The hood 14 provides covering and protection to components of the vehicle 10, for example, the hood 14 may cover an engine compartment and protect an engine, a radiator, and/or other components located therein. The hood 14 includes an external surface. The external surface of the hood 14 may be a class-A exterior surface. The hood 14 may be formed of any suitable material, for example, metal (e.g., steel, aluminum, etc.) or polymeric (e.g., sheet molding composite (SMC), carbon fiber reinforced plastic (CFRP), fiberglass, and/or other fiber reinforced plastic).

The windshield 38 is disposed at the front end 30 of a passenger cabin of the vehicle 10. The windshield 38 may extend from one side of the vehicle 10 to the other side of the vehicle 10. The windshield 38 may face in a forward direction from the passenger cabin. The windshield 38 may be any suitably transparent material, including glass such as laminated, tempered glass, etc.

The grille assembly 32 includes the grille 12 and the airbag assembly 44. The grille 12 and the airbag assembly 44 move together as a unit after the airbag assembly 44 is mounted to the grille 12. The grille assembly 32 may be assembled to the rest of the vehicle 10 as a unit (e.g., connected as a unit to the vehicle body 48 and/or radiator, etc., at a vehicle assembly plant). In such examples, the grille assembly 32, with the airbag assembly 44 mounted to the grille 12 and moveable with the grille 12 as a unit, is mounted to the rest of the vehicle 10, as described above. An electrical connector of an inflator 46 of the airbag assembly 44 may be connected to an electrical connector of the vehicle 10 during assembly of the grille assembly 32 to the rest of the vehicle 10.

When assembled to the rest of the vehicle 10, the grille 12 is at the front end 30 of the vehicle 10. The grille 12 is connected to the vehicle body 48 (e.g., the bumper 34), the vehicle frame, a radiator, etc. For example, the grille 12 may be connected to the rest of the vehicle 10 with clips, fasteners, etc. The grille 12 is between the hood 14 and the bumper 34 and is upright along the vertical axis V. In some examples, the grille 12 may have a top edge adjacent the hood 14 and a bottom edge adjacent the bumper 34. In such examples, gaps may be between the hood 14 and the grille 12 and between the hood 14 and the windshield 38.

The grille 12 defines a fore-and-aft axis FA, a cross-grille axis CA, and an upright axis UA. The grille 12 defines the grille 12-rearward direction along the fore-and-aft axis FA. The fore-and-aft axis FA and the cross-grille axis CA are perpendicular to each other. In some examples, the upright axis UA is perpendicular to fore-and-aft axis FA and the cross-grille axis CA. As set forth above, the grille 12 is upright along the vertical axis V. For example, the upright axis UA may be parallel with the vertical axis V. In other examples, the upright axis UA may be angled e.g., angled vehicle-rearward from a bottom of the grille 12 toward the top of the grille 12, to accommodate for vehicle styling. The fore-and-aft axis FA is parallel with the vehicle-longitudinal axis L when the grille 12 is assembled to the vehicle 10. The cross-grille axis CA is parallel with the cross-vehicle axis C when the grille 12 is assembled to the vehicle 10.

The grille 12 includes a body 48 defining a slot 50. As set forth above, the grille 12 includes the upper door 22 and the lower door 24. The upper door 22 and the lower door 24 are at the slot 50. The airbag 16 is inflatable through the slot 50 from the uninflated position to the inflated position, as described further below. In the example shown in the Figures, the grille 12 includes a bar 52 that supports the upper door 22, the lower door 24, and/or the airbag assembly 44.

The body 48 of the grille 12 may have slits extending through the body 48 of the grille 12 in the fore-and-aft axis. For example, the slits may allow airflow through the body 48 of the grille 12 for HVAC components that are vehicle rearward of the grille 12, e.g., a radiator, condenser, BEV battery, etc. In such examples, active grille shutters may be between the body 48 of the grille 12 and the HVAC components to control the flow of air through the slits of the body 48 of the grille 12. In other examples, the body 48 of the grille 12 may be a solid panel that allows no airflow therethrough. In such examples, the grille 12 may be decorative and may be used, for example, at the front end 30 of a battery-electric vehicle 10.

The grille 12 includes a class-A surface 26 (as introduced above), i.e., a finished surface exposed to view by a customer and free of unaesthetic blemishes and defects. Specifically, the class-A surface 26 of the grille 12 may extend across the body 48 of the grille 12, the upper door 22, and the lower door 24. In some examples, the upper door 22 and the lower door 24 conceal the bar 52 and the airbag assembly 44 when the airbag assembly 44 is in the uninflated position. In such examples, the bar 52 and the airbag assembly 44 are concealed by the class-A surface 26 of the grille 12.

The class-A surface 26 of the grille 12 may be, for example, chromed, gloss painted, matte painted, etc. The appearance of the class-A surface 26 at the upper door 22 and the lower door 24 may match the appearance of the class-A surface 26 at the body 48 of the grille 12, i.e., may match the color, gloss, surface texture, etc. In some examples, faces 54 of the upper door 22 and the lower door 24 may be flush with and continuous with the face 56 of the body 48 of grille 12, i.e., with no parting lines between the faces 54 of the doors 22, 24 and the face 56 of the body 48. Similarly, in some examples, the face 54 of the upper door 22 and the face 54 of the lower door 24 may be flush with and continuous with each other, i.e., with no parting lines between the faces 54 of the doors 22, 24. Accordingly, in some examples, the face 56 of the body 48, the face 54 of the upper door 22, and the face 54 of the lower door 24 have the appearance of a unitary component to an observer at the exterior of the vehicle 10.

The body 48 of the grille 12 defines a slot 50 that receives the upper door 22 and the lower door 24. The body 48 of the grille 12 may include side portions 58 on opposing cross-grille (e.g., cross-vehicle) sides of the body 48 of the grille 12. For example, the body 48 of the grille 12 may include ears 60 extending upwardly along the slot 50 on opposing sides of the slot 50. The class-A surface 26 of the face 54 may extend along the ears 60 in some examples. In other examples, the ears 60 may be concealed by the upper door 22 and/or the lower door 24.

In some examples, the slot 50 is at an uppermost edge 62 of the body 48 of the grille 12. In some examples, including the example shown in the Figures, the slot 50 is recessed downwardly relative to end portions of the grille 12, e.g., with the ears 60 of the grille 12 extending upwardly along the slot 50 on opposing cross-grille sides of the slot 50. In such examples, the slot 50 and the ears 60 are at the uppermost edge 62 of the body 48 of the grille 12. In the example shown in the Figures, an uppermost edge 62 of the grille 12 extends along the slot 50 and the ears 60. In other examples, the slot 50 may be disposed below an upper portion of the body 48 of the grille 12, e.g., a crossmember including the class-A surface 26 of the face 56 that extends above the slot 50.

The slot 50 may be centered cross-grille, e.g., centered cross-vehicle when the grille assembly 32 is mounted to the rest of the vehicle 10. The slot 50 may extend across a majority of the upper end of the grille 12, i.e., more than 50% of the upper end of the grille 12 in the cross-vehicle direction. The slot 50 may extend across, for example 80-90% of the grille 12 in the cross-vehicle direction.

In some examples, including the example shown in the Figures, the slot 50 extends through the face 56 of the body 48 of the grille 12. Specifically, the slot 50 extends through the face 56 and a rear side 64 of the body 48 of the grille 12.

The bar 52 is elongated cross-vehicle along the slot 50. The bar 52 may be vehicle-rearward of the slot 50, as shown in the example in the Figures. The bar 52 may be aligned vertically with the slot 50, as shown in the example in the Figures. The airbag 16 is supported by the bar 52 in the uninflated position and the inflated position. Specifically, the airbag 16 may be supported directly by the bar 52 in the uninflated position and in the inflated position. In such examples, the airbag 16 may be mounted directly to the bar 52, e.g., with fasteners, clips, etc. The bar 52 is a reaction surface for the airbag 16 as the airbag 16 inflates from the uninflated position to the inflated position.

The bar 52 and the grille 12 move together as a unit. In some examples, the bar 52 and the body 48 of the grille 12 may be unitary. In such examples, the bar 52 and the body 48 are a single, uniform piece of material with no seams, joints, fasteners, or adhesives holding them together. Specifically, the bar 52 and the body 48 are formed together simultaneously as a single continuous unit, e.g., by machining from a unitary blank, molding, forging, casting, etc. In other examples, the bar 52 may be formed separately from the body 48 of the grille 12 and subsequently attached to the body 48 of the grille 12, e.g., by overmolding, adhesive, bonding, and/or mechanical attachment such as fasteners, clips, etc. In some examples, the bar 52 may be of the same type of material as the body 48 of the grille 12. In other examples, the bar 52 may be a different type of material. The bar 52 and/or the body 48 may be, for example, plastic, composite and/or metal (e.g., aluminum or steel).

The upper door 22 and the lower door 24 conceal the slot 50 and the airbag 16 when the airbag 16 is in the uninflated position. Specifically, the upper door 22 and the lower door 24 are vehicle forward of the slot 50. As the airbag 16 moves to the inflated position, the airbag 16 displaces the doors 22, 24 and moves through the slot 50 to the inflated position.

In the example shown in the Figures, the upper door 22 and the lower door 24 are mounted to the bar 52 when the airbag 16 is in the uninflated position. The upper door 22 and the lower door 24 rotate about the bar 52 as the airbag 16 displaces the upper door 22 and the lower door 24 during inflation of the airbag 16. The upper door 22 and the lower door 24 guide the direction of inflation of the airbag 16 as the airbag 16 inflates to the inflated position. In some examples, the upper door 22 and the lower door 24 remain connected to the bar 52 after the airbag 16 reaches the inflated position, as shown in FIG. 5. In other examples, the upper door 22 and/or the lower door 24 may release from the bar 52 during inflation of the airbag 16 to the inflated position.

The upper door 22 includes a top edge 66 and the lower door 24 includes a bottom edge 68. The upper door 22 and the lower door 24 are both mounted to the bar 52 between the top edge 66 of the upper door 22 and the bottom edge 68 of the lower door 24. In some examples, the upper door 22 and the lower door 24 are both mounted to the bar 52 at a midpoint between the top edge 66 of the upper door 22 and the bottom edge 68 of the lower door 24. The upper door 22 and the lower door 24, for example, may meet and abut each other at the bar 52. In some examples, including the example shown in the Figures, the top edge 66 of the upper door 22 is the uppermost edge 62 of the body 48 of the grille 12. In such examples, the top edge 66 of the upper door 22 is adjacent the hood 14.

The upper door 22 is displaceable by the upper panel 18 of the airbag 16 during inflation to the inflated position and the lower door 24 is displaceable by the lower panel 20 of the airbag 16 during inflation to the inflated position. The upper door 22 and the lower door 24 are designed to be displaced by the airbag 16 as the airbag 16 inflates from the uninflated position to the inflated position. For example, the upper door 22 and the lower door 24 may be positioned, sized, shaped, etc., to be displaced by the airbag 16 as the airbag 16 inflates.

For example, in some examples, the upper door 22 and the lower door 24 are unitary with each other and unitary with the body 48 of the grille 12 when the airbag 16 is in the uninflated position. In such examples, the upper door 22, the lower door 24, and the body 48 are a single, uniform piece of material with no seams, joints, fasteners, or adhesives holding them together, e.g., formed together simultaneously as a single continuous unit such as by machining from a unitary blank, molding, forging, casting, etc. In such examples, the upper door 22 and the lower door 24 may include weakened lines 70 at the rear side 64 of the body 48 of the grille 12 to encourage separation of the doors 22, 24 from the body 48 of the grille 12 at the weakened lines 70. In such examples, the weakened lines 70 define the slot 50, i.e., the airbag 16 opens the upper door 22 and the lower door 24 at the weakened lines 70 to open the slot 50 as the airbag 16 inflates to the inflated position. In other examples, the upper door 22 and/or the lower door 24 may be formed separately from each other and/or the body 48 and subsequently attached. In such examples, the upper door 22 and the lower door 24 may be separate from the body 48 of the grille 12 at seams between the door and the body 48 of the grille 12 under force of the airbag 16 as the airbag 16 inflates from the uninflated position to the inflated position. In such examples, the seams define the slot 50. In some examples, the upper door 22 and/or the lower door 24 may be of the same type of material as the body 48 of the grille 12, e.g., plastic, composite and/or metal (e.g., aluminum or steel).

As set forth above, the upper door 22 and the lower door 24 are mounted to the bar 52. The upper door 22 and the lower door 24 are designed to bend at the bar 52 as the airbag 16 inflates from the inflated position to the uninflated position, i.e., the upper door 22 and the lower door 24 are sized, shaped, positioned, etc., to bend under the force of the inflation of the airbag 16. In some examples, as shown in the example in FIGS. 2 and 5, the upper door 22 and the lower door 24 are designed to remain connected to the bar 52 as the doors bend as the airbag 16 inflates to the inflated position. In other examples, the upper door 22 and the lower door 24 are designed to release from the bar 52 as the doors 22, 24 bend as the airbag 16 inflates to the inflated position. In both examples, the upper door 22 may be designed to guide inflation of the upper panel 18 of the airbag 16 across the hood 14, i.e., may bend during inflation to guide the upper panel 18. Similarly, the lower door 24 may be designed to guide inflation of the lower panel 20 of the airbag 16 across the grille 12, i.e., may bend during inflation to guide the lower panel 20.

Figure 3:
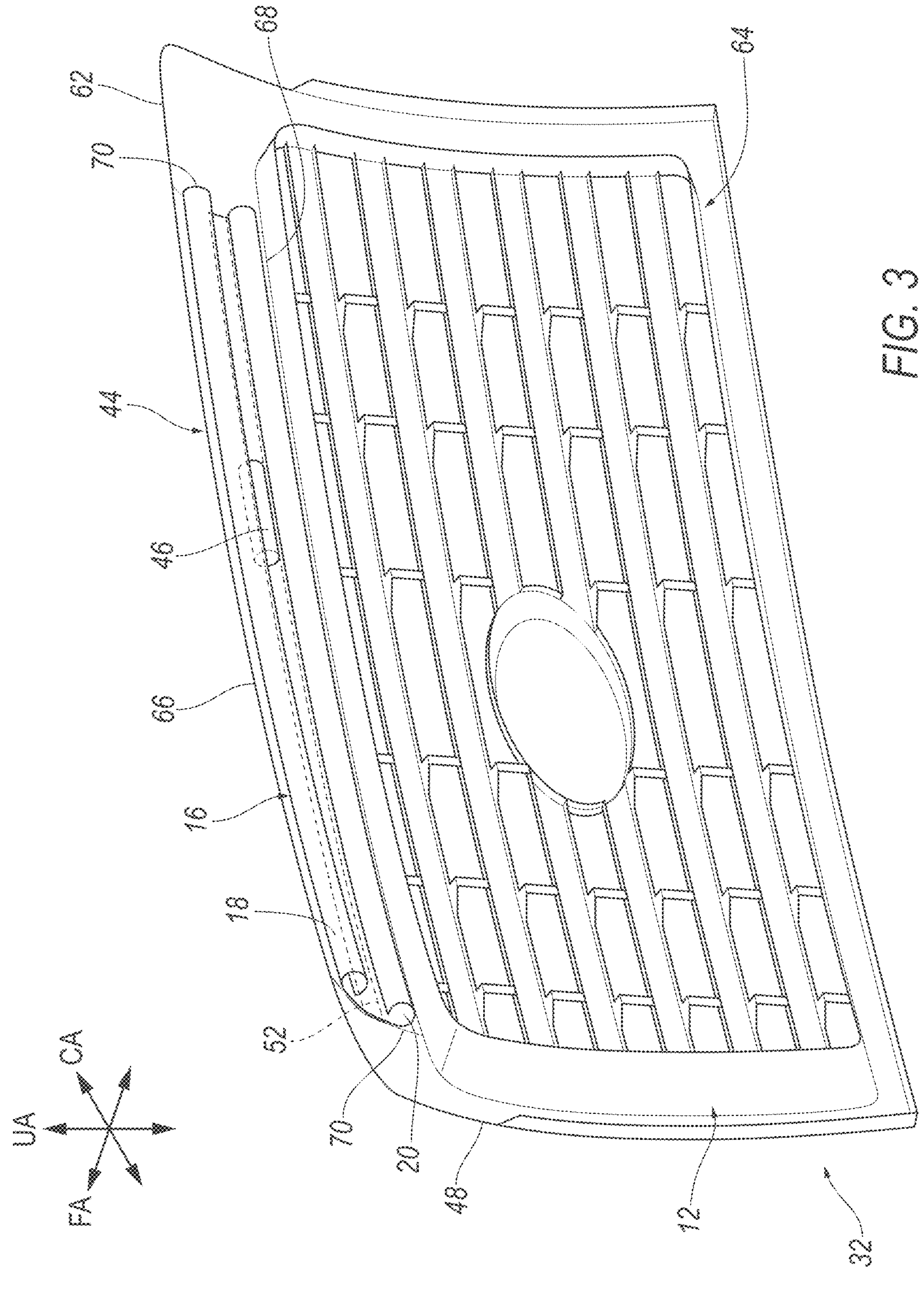
FIG. 3 is a perspective view of a rear of the grille assembly.
Figure 4:
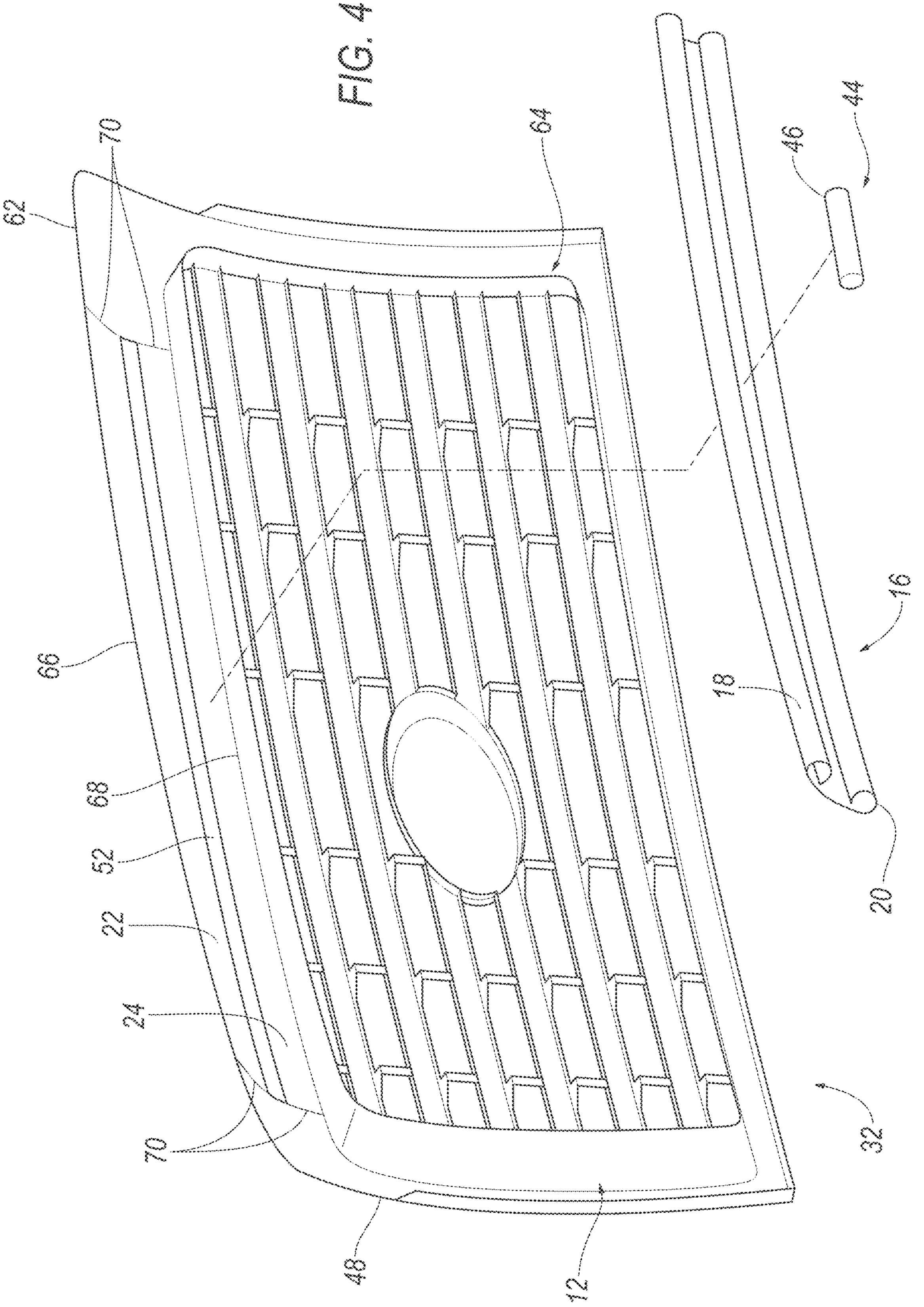
FIG. 4 is a perspective view of a portion of the grille assembly.
Figure 5:
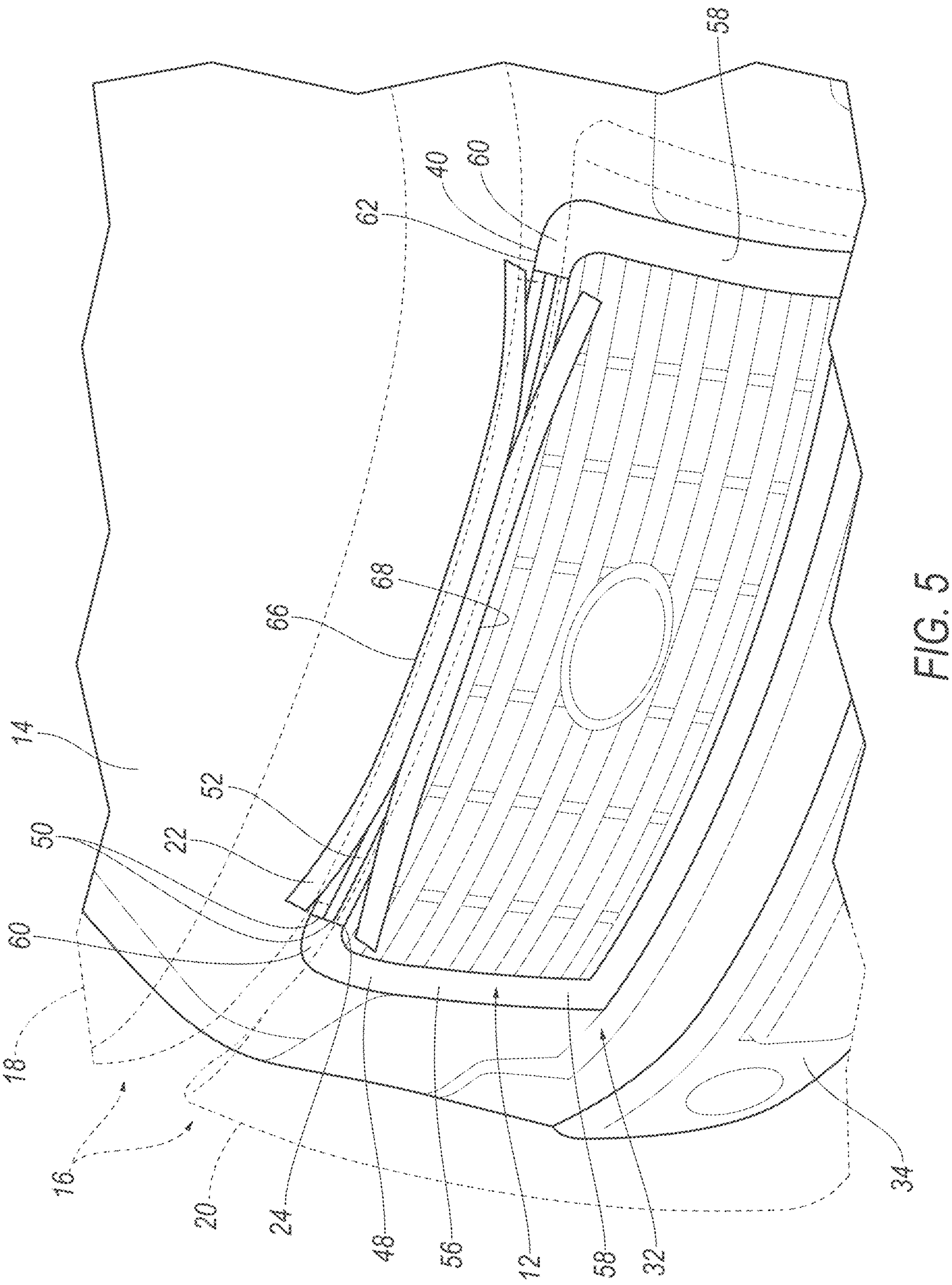
FIG. 5 is a view of the front end of the vehicle with the airbag in the inflated position and shown in hidden lines.

The bar 52 may be recessed from the face 56 of the body 48 of the grille 12, as shown in FIGS. 3-5. In such examples, the faces 54 of the upper door 22 and the lower door 24 may be flush with the face 56 of the body 48 of the grille 12, as described above. The upper door 22 and the lower door 24 are vehicle forward of the airbag 16 in the uninflated position. Specifically, the airbag 16 is mounted to the bar 52 vehicle rearward of the upper door 22 and the lower door 24.

The airbag assembly 44 includes the airbag 16 and the inflator 46. The airbag 16 inflatable from the uninflated position (FIGS. 1, 3, 4) to the inflated position (FIGS. 2 and 5). Specifically, the inflator 46 inflates the airbag 16 to the inflated position. The airbag 16 is inflatable through the slot 50 from the uninflated position to the inflated position.

The airbag 16 extends vehicle forward of grille 12 and is the forward-most component of the vehicle 10 vehicle-forward of the grille 12 in the inflated position. The airbag 16 extends over hood 14 and is the uppermost component of the vehicle 10 over the hood 14. Specifically, the airbag 16 includes the upper panel 18 inflatable vehicle rearward from the grille 12 over the hood 14, and the airbag 16 includes the lower panel 20 inflatable vehicle forward of the grille 12.

The upper panel 18 is inflatable through the slot 50 and is inflatable rearward from the uninflated position to the inflated position, and the lower panel 20 is inflatable through the slot 50 downward from the uninflated position to the inflated position. In some examples, the upper door 22 may guide inflation of the upper panel 18, and the lower door 24 may guide inflation of the lower panel 20, as described above.

In the inflated position, the upper panel 18 extends from the grille 12 toward the windshield 38. Specifically, the upper panel 18 may extend vehicle rearward beyond a cross-vehicle midline of the hood 14, as shown in the example in the Figures. The lower panel 20 extends from the bar 52 toward the bumper 34. In the example shown in the Figures, the lower panel 20 extends from the bar 52 downwardly beyond a vertical midline of the grille 12.

The airbag 16 may be mounted to a vehicle-rearward side of the bar 52, as shown in FIGS. 3 and 4. In the uninflated position, the upper panel 18 and the lower panel 20 may be rolled, such as is shown in FIGS. 3-4. In the uninflated position, the upper panel 18 of the airbag 16 is rolled in one direction adjacent the upper door 22 and the lower panel 20 of the airbag 16 is rolled in another direction adjacent the lower door 24. When inflated from the uninflated position to the inflated position, the upper panel 18 and the lower panel 20 unroll to the inflated positions shown in FIGS. 2 and 5.

The upper panel 18 of the airbag 16 is between the bar 52 and the hood 14 in the inflated position and the lower panel 20 of the airbag 16 is between the bar 52 and a lower panel 20 of the grille 12 in the inflated position. The airbag 16 may be thinner at the intersection of the upper panel 18 and the lower panel 20 to encourage opening of the airbag 16 from the uninflated position to the inflated position. Specifically, the upper panel 18 and the lower panel 20 may increase in thickness from the intersection of the upper panel 18 and the lower panel 20 toward free ends of the upper panel 18 and the lower panel 20.

In some examples, the upper panel 18 and the lower panel 20 are in fluid communication with each other so that the inflator 46 inflates both the upper panel 18 and the lower panel 20 with one supply of inflation medium. In other examples, the upper panel 18 and the lower panel 20 may be fluidly isolated from each other such that one or more inflators 46 provide separate supplies of inflation medium to the upper panel 18 and the lower panel 20.

In some examples, including the example shown in the Figures, the upper panel 18 and the lower panel 20 each include inflatable members 72 enclosed by uninflatable panels 74. In such examples, the inflatable members 72 are inflatable to the inflated position by the inflator 46. The inflatable members 72 in the inflated position may be elongated. The inflatable member 72 in the inflated position may each define an inflation chamber. For example, each inflatable member 72 may be tubular in shape and surround a respective inflation chamber. For example, each of the inflatable members 72 in the inflated position may be circular in cross section, as shown in the example in the Figures. The uninflatable panels 74 are not in fluid communication with the inflation chamber. In other words, the uninflatable panels 74 are separated from any inflation chambers of the inflatable members 72. The uninflatable panels 74 do not include a chamber inflatable by inflation medium. When the inflatable members 72 are in the inflated position, the inflatable members 72 may pull the uninflatable panels 74 taught between each respective inflatable member 72, The inflatable members 72 may be connected to each other and/or to respective uninflatable panels 74 by, for example, stitching, adhesive, welding, unitary formation, etc.

The inflatable members 72 and/or the uninflatable members 74 may be fabric. In the examples shown in the figures, the inflatable members 72 and the uninflatable members 74 may be of the same type of fabric. As an example, the fabric may be a woven polymer fabric or any other material. As one example, the inflatable members 72 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 16 is supported by the grille 12 in the uninflated position and in the inflated position. Specifically, the weight of the airbag 16 is borne by the grille 12 in both the uninflated position and the inflated position. Specifically, the airbag 16 is supported by the bar 52 of the grille 12 in the uninflated position and in the inflated position.

The inflator 46 is in fluid communication with the airbag 16. In some examples, including the example shown in the Figures, the inflator 46 is supported by the bar 52. In such examples, the inflator 46 may be mounted directly to the bar 52, e.g., with fasteners, clips, etc.

The inflator 46 is in fluid communication with the airbag 16. The inflator 46 expands the airbag 16 with inflation medium, such as a gas, to move the airbag 16 from the uninflated position to the inflated position. The inflator 46 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 46 may be, for example, at least partially in the inflation chamber to deliver inflation medium directly to the inflation chamber or may be connected to the inflation chamber through fill tubes, diffusers, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:

a grille;

a hood disposed above the grille and extending vehicle rearward of the grille; and an airbag inflatable from an uninflated position to an inflated position, the airbag being supported by the grille in the uninflated position and in the inflated position;

the airbag including an upper panel inflatable vehicle rearward from the grille above the hood;

the airbag including a lower panel inflatable vehicle forward of the grille;

the grille including a body defining a slot, an upper door at the slot, and a lower door at the slot, the airbag being inflatable through the slot from the uninflated position to the inflated position;

the grille including a bar elongated cross-vehicle along the slot, the airbag being supported by the bar in the uninflated position and the inflated position; and the upper panel of the airbag is between the bar and the hood in the inflated position and the lower panel of the airbag is between the bar and a lower portion of the grille in the inflated position.

2. The vehicle as set forth in claim 1, wherein the upper door and the lower door are vehicle-forward of the airbag in the uninflated position.

3. The vehicle as set forth in claim 1, wherein the upper door and the lower door are unitary when the airbag is in the uninflated position.

4. The vehicle as set forth in claim 1, wherein the upper door and the lower door have a class-A surface facing vehicle forward.

5. The vehicle as set forth in claim 1, wherein a top edge of the upper door is an uppermost edge of the grille.

6. The vehicle as set forth in claim 5, wherein the top edge of the upper door is adjacent the hood.

7. The vehicle as set forth in claim 1, wherein the upper door includes a top edge, the lower door includes a bottom edge, and the upper door and the lower door are mounted to the bar between the top edge and the bottom edge.

8. The vehicle as set forth in claim 7, wherein the upper door extends upwardly from the bar to the top edge, and the lower door extends downwardly from the bar to the bottom edge.

9. The vehicle as set forth in claim 1, further comprising an inflator in fluid communication with the airbag, the inflator being supported by the bar.

10. The vehicle as set forth in claim 1, wherein the bar is vehicle rearward of the upper door and the lower door.

11. The vehicle as set forth in claim 1, wherein the slot is at an uppermost end of the body of the grille.

12. The vehicle as set forth in claim 1, wherein, in the uninflated position, the upper panel of the airbag is rolled in one direction adjacent the upper door and the lower panel of the airbag is rolled in another direction adjacent the lower door.

13. The vehicle as set forth in claim 1, wherein the upper door is displaceable by the upper panel of the airbag during inflation to the inflated position and the lower door is displaceable by the lower panel of the airbag during inflation to the inflated position.

14. An assembly, comprising:

a grille including a body defining a slot, the slot being at an uppermost end of the body of the grille;

the grille including an upper door at the slot and a lower door at the slot; and an airbag inflatable from an uninflated position to an inflated position, the airbag being supported by the grille in the uninflated position and in the inflated position;

the grille includes a bar elongated along the slot, the airbag being supported by the bar in the uninflated position and the inflated position;

the airbag including an upper panel inflatable through the slot and rearward from the uninflated position to the inflated position; and the airbag including a lower panel inflatable through the slot downward from the uninflated position to the inflated position.

15. The assembly as set forth in claim 14, wherein the body of the grille, the upper door, and the lower door each has a class-A surface and the slot is at the class-A surface of the grille.

16. The assembly as set forth in claim 14, wherein the upper door is displaceable by the upper panel of the airbag during inflation to the inflated position and the lower door is displaceable by the lower panel of the airbag during inflation to the inflated position.

17. The assembly as set forth in claim 14, wherein the upper door includes a top edge, the lower door includes a bottom edge, and the upper door and the lower door are mounted to the bar between the top edge and the bottom edge.

18. A vehicle comprising:

a grille;

a hood disposed above the grille and extending vehicle rearward of the grille; and an airbag inflatable from an uninflated position to an inflated position, the airbag being supported by the grille in the uninflated position and in the inflated position;

the airbag including an upper panel inflatable vehicle rearward from the grille above the hood;

the airbag including a lower panel inflatable vehicle forward of the grille;

the grille including a body defining a slot, an upper door at the slot, and a lower door at the slot, the airbag being inflatable through the slot from the uninflated position to the inflated position;

the grille including a bar elongated cross-vehicle along the slot, the airbag being supported by the bar in the uninflated position and the inflated position; and the slot is at an uppermost end of the body of the grille.

19. The vehicle as set forth in claim 18, wherein the upper panel of the airbag is between the bar and the hood in the inflated position and the lower panel of the airbag is between the bar and a lower portion of the grille in the inflated position.

* * * * *